(12) United States Patent
Oberman

(10) Patent No.: US 6,487,575 B1
(45) Date of Patent: Nov. 26, 2002

(54) EARLY COMPLETION OF ITERATIVE DIVISION

(75) Inventor: Stuart F. Oberman, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/385,188

(22) Filed: Aug. 30, 1999

Related U.S. Application Data
(60) Provisional application No. 60/098,613, filed on Aug. 31, 1998.

(51) Int. Cl.$^7$ .............................. G06F 7/38; G06F 7/52
(52) U.S. Cl. ...................................... 708/504; 708/654
(58) Field of Search ................................ 708/502, 503, 708/504, 650, 654, 495, 496, 497

(56) References Cited

U.S. PATENT DOCUMENTS

| | | | | |
|---|---|---|---|---|
| 5,249,149 A | * | 9/1993 | Cocanougher et al. ...... | 708/504 |
| 5,262,973 A | * | 11/1993 | Richardson ................. | 708/525 |
| 5,339,266 A | * | 8/1994 | Hinds et al. ........... | 364/748.01 |
| 5,434,809 A | * | 7/1995 | Taniguchi ................... | 708/605 |
| 5,828,591 A | * | 10/1998 | Rotstain ..................... | 708/654 |

OTHER PUBLICATIONS

A.D. Booth, "A Signed Binary Multiplication Technique," Quarterly Journal of Mechanics and Applied Materials, vol. 4, No. 2, pp. 236–240, 1951.

Bewick & Flynn, "Binary Multiplication Using Partially Redundant Multiples," Technical Report No. CSL–TR–92–528M, Jun. 1992, Departments of Electrical Engineering and Computer Seience, Stanfor University (26 sheets).

Hennessy & Patterson, "Computer Architecture: A Quantitative Approach," pp. A–2 to A–16 and A–20 to A–22, Morgan Kaufmann Publishers, Palo Alto California, 1990.

IEEE–754 Binary Floating–Point Arithmetic (READ), IEEE Standards, revised 1998, pp. 1–18.

"Achieving High Levels of Instruction–Level Parallelism with Reduced Hardware Complexity," Schlansker, et al., Computer Research Center, Nov. 1994, 87 pages.

* cited by examiner

Primary Examiner—Chuong Dinh Ngo
(74) Attorney, Agent, or Firm—B. Noël Kivlin

(57) ABSTRACT

A multiplier configured to execute division and square root operations by executing iterative multiplication operations is disclosed. The multiplier is configured to complete divide-by-two and zero dividend instructions in fewer clock cycles by detecting them before or during the first iteration and then performing an exponent adjustment and rounding the result to the desired precision. A system and method for rapidly executing divide-by-two and zero dividend instructions within the context of a multiplier that executes division and square root instructions using iterative multiplication are also disclosed.

19 Claims, 16 Drawing Sheets

| | BASE 10 | BINARY |
|---|---|---|
| SCALAR MULTIPLICATION | | |
| SCALAR MULTIPLICAND | 24 | 0001 1000 (8-BIT) |
| SCALAR MULTIPLIER | 200 | 1100 1000 (8-BIT) |
| SCALAR FINAL PRODUCT | 4800 | 0001 0010 1100 0000 (16-BIT) |
| VECTOR MULTIPLICATION | | |
| VECTOR MULTIPLICAND | (12, 5) | 1100 0101 (4 BITS PER COMPONENT) |
| VECTOR MULTIPLIER | (7, 4) | 0111 0100 (4 BITS PER COMPONENT) |
| VECTOR FINAL PRODUCT | (84, 20) | 0101 0100 0001 0100 (8 BITS PER COMPONENT) |

*FIG. 1*

EXEMPLARY
INTEGER FORMAT

EXEMPLARY FLOATING
POINT FORMAT

MULTIPLIER

Multiplicand ("M") = 11100110 ($230_{10}$)

Multiplier = 11110000 ($240_{10}$)

```
        00000000    0 LSB
        00000000    0
        00000000    0
        00000000    0  -> Multiplier
        11100110    1
        11100110    1
        11100110    1
        11100110    1 MSB
```
1101011110100000 ->  final product

FIG. 5A
ADD-AND-SHIFT ALGORITHM

Multiplicand ("M") = 11100110 ($230_{10}$)

Multiplier = 11110000 ($240_{10}$)

```
                          0 (padding zero)
              1000000000  0 LSB
                          0
             11000000000  0
                          0 -> Multiplier
              1010011010  1
                          1
              1000000000  1
                          1 MSB
               011100110  0 (padding zero)
             +            0 (padding zero)
```
1101011110100000 ->
    final product

FIG. 5B
2-BIT BOOTH'S ALGORITHM

| CLOCK CYCLE | MULTIPLIER PIPE STAGE 1 | MULTIPLIER PIPE STAGE 2 | MULTIPLIER PIPE STAGE 3 | MULTIPLIER PIPE STAGE 4 | |
|---|---|---|---|---|---|
| 4 | $D_0=X_0 \times B$ \| $R_0=(D_0)^{-1}$ | | | | |
| 5 | $N_0=A \times X_0$ | $D_0=X_0 \times B$ \| $R_0=(D_0)^{-1}$ | | | |
| 6 | ///// | $N_0=A \times X_0$ | $D_0=X_0 \times B$ \| $R_0=(D_0)^{-1}$ | | |
| 7 | ///// | ///// | $N_0=A \times X_0$ | $D_0=X_0 \times B$ \| $R_0=(D_0)^{-1}$ | ⎫ 90 |
| 8 | $D_1=D_0 \times R_0$ \| $R_1=(D_1)^{-1}$ | ///// | ///// | $N_0=A' X_0$ | ⎭ |
| 9 | $N_1=N_0 \times R_0$ | $D_1=D_0 \times R_0$ \| $R_1=(D_1)^{-1}$ | ///// | ///// | ⎫ 86a |
| 10 | ///// | $N_1=N_0 \times R_0$ | $D_1=D_0 \times R_0$ \| $R_1=(D_1)^{-1}$ | ///// | ⎭ |
| 11 | ///// | ///// | $N_1=N_0 \times R_0$ | $D_1=D_0 \times R_0$ \| $R_1=(D_1)^{-1}$ | ⎫ 92 |
| 12 | $D_2=D_0 \times R_0$ \| $R_2=(D_2)^{-1}$ | ///// | ///// | $N_1=N_0 \times R_0$ | ⎭ |
| 13 | $N_2=N_1 \times R_1$ | $D_2=D_1 \times R_1$ \| $R_2=(D_2)^{-1}$ | ///// | ///// | ⎫ 86b |
| 14 | ///// | $N_2=N_1 \times R_1$ | $D_2=D_1 \times R_1$ \| $R_2=(D_2)^{-1}$ | ///// | ⎭ |
| 15 | ///// | ///// | $N_2=N_1 \times R_1$ | $D_2=D_1 \times R_1$ \| $R_2=(D_2)^{-1}$ | ⎫ 94 |
| 16 | ///// | ///// | ///// | $N_2=N_1 \times R_1$ | ⎭ |
| 17 | $Q=N_2 \times R_2$ | ///// | ///// | ///// | ⎫ |
| 18 | ///// | $Q=N_2 \times R_2$ | ///// | ///// | ⎬ 86c |
| 19 | ///// | ///// | $Q=N_2 \times R_2$ | ///// | ⎭ |
| 20 | ///// | ///// | ///// | $Q=N_2 \times R_2$ | ⎬ 96 |
| 21 | REM=Q×B−A | ///// | ///// | ///// | ⎫ |
| 22 | | REM=Q×B−A | ///// | ///// | ⎬ 86d |
| 23 | | | REM=Q×B−A | ///// | ⎭ |
| 24 | | | | REM=Q×B−A | ⎬ 98 |

| CLK | 120 | 140 | MULTIPLIER PIPE STAGE 1 | MULTIPLIER PIPE STAGE 2 | MULTIPLIER PIPE STAGE 3 | MULTIPLIER PIPE STAGE 4 | |
|---|---|---|---|---|---|---|---|
| 1 | | 0 | 142D | 142C | 142B | 142A | |
| 2 | | 1 | 142E | 142D | 142C | 142B | |
| 3 | | 1 | 142F | 142E | 142D | 142C | |
| 4 | | 0 | $D_0 = X_0 \times B$ \| $R_0 = (D_0)^{-1}$ | 142F | 142E | 142D | |
| 5 | | 0 | $N_0 = A \times X_0$ | $D_0 = X_0 \times B$ \| $R_0 = (D_0)^{-1}$ | 142F | 142E | |
| 6 | | 1 | MULT OP 1 | $N_0 = A \times X_0$ | $D_0 = X_0 \times B$ \| $R_0 = (D_0)^{-1}$ | 142F | |
| 7 | | 1 | MULT OP 2 | MULT OP 1 | 0.2577 | $D_0 = X_0 \times B$ \| $R_0 = (D_0)^{-1}$ | |
| 8 | | 0 | $D_1 = D_0 \times R_0$ \| $R_1 = (D_1)^{-1}$ | MULT OP 2 | MULT OP 1 | 0.2577 | |
| 9 | | 0 | $N_1 = N_0 \times R_0$ | $D_1 = D_0 \times R_0$ \| $R_1 = (D_1)^{-1}$ | MULT OP 2 | MULT OP 1 | ⎫ |
| 10 | | 1 | MULT OP 3 | $N_1 = N_0 \times R_0$ | $D_1 = D_0 \times R_0$ \| $R_1 = (D_1)^{-1}$ | MULT OP 2 | ⎬ 148A |
| 11 | | 1 | MULT OP 4 | MULT OP 3 | $N_1 = N_0 \times R_0$ | $D_1 = D_0 \times R_0$ \| $R_1 = (D_1)^{-1}$ | ⎭ |
| 12 | | 1 | $D_2 = D_1 \times R_1$ \| $R_2 = (D_2)^{-1}$ | MULT OP 4 | MULT OP 3 | $N_1 = N_0 \times R_0$ | |
| 13 | | 0 | $N_2 = N_1 \times R_1$ | $D_2 = D_1 \times R_1$ \| $R_2 = (D_2)^{-1}$ | MULT OP 4 | MULT OP 3 | ⎫ |
| 14 | | 1 | MULT OP 5 | $N_2 = N_1 \times R_1$ | $D_2 = D_1 \times R_1$ \| $R_2 = (D_2)^{-1}$ | MULT OP 4 | ⎬ 148B |
| 15 | | 1 | MULT OP 6 | MULT OP 5 | $N_2 = N_1 \times R_1$ | $D_2 = D_1 \times R_1$ \| $R_2 = (D_2)^{-1}$ | ⎭ |
| 16 | | 1 | MULT OP 7 | MULT OP 6 | MULT OP 5 | $N_2 = N_1 \times R_1$ | |
| 17 | | 0 | $Q = N_2 \times R_2$ | MULT OP 7 | MULT OP 6 | MULT OP 5 | ⎫ |
| 18 | | 1 | MULT OP 8 | $Q = N_2 \times R_2$ | MULT OP 7 | MULT OP 6 | ⎬ 148C |
| 19 | | 1 | MULT OP 9 | MULT OP 8 | $Q = N_2 \times R_2$ | MULT OP 7 | ⎭ |
| 20 | | 1 | MULT OP 10 | MULT OP 9 | MULT OP 8 | $Q = N_2 \times R_2$ | |
| 21 | | 1 | REM = Q×B−A | MULT OP 10 | MULT OP 9 | MULT OP 8 | |
| 22 | | 1 | 144A | REM = Q×B−A | MULT OP 10 | MULT OP 9 | ⎫ |
| 23 | | 1 | 144B | 144A | REM = Q×B−A | MULT OP 10 | ⎬ 148D |
| 24 | | 1 | 144C | 144B | 144A | REM = Q×B−A | ⎭ |

FIG. 9

| Internal Clock Cycle 120 | ScrA selected by Multiplexer 176 | ScrB selected by Multiplier 180 | First Pipeline Stage Function | NewMulInFour 118 |
|---|---|---|---|---|
| 1 | Operand A | Operand B | | 0 |
| 2 | | | | 1 |
| 3 | | | | 1 |
| 4 | $X_0$ | B | $D_0 = X_0 \times B$ | 0 |
| 5 | A | $X_0$ | $N_0 = A \times X_0$ | 0 |
| 6 | | | | 1 |
| 7 | | | | 1 |
| 8 | $D_0$ | $R_0$ | $D_1 = D_0 \times R_0$ | 0 |
| 9 | $N_0$ | $R_0$ | $N_1 = N_0 \times R_0$ | 0 |
| 10 | | | | 1 |
| 11 | | | | 1 |
| 12 | $D_1$ | $R_1$ | $D_2 = D_1 \times R_1$ | 1 |
| 13 | $N_1$ | $R_1$ | $N_2 = N_1 \times R_1$ | 0 |
| 14 | | | | 1 |
| 15 | | | | 1 |
| 16 | $N_2$ | $R_2$ | $Q = N_2 \times R_2$ | 1 |
| 17 | | | | 1 |
| 18 | | | | 0 |
| 19 | | | | 1 |
| 20 | | | | 1 |
| 21 | Q | B | REM = Q×B − A | 1 |
| 22 | OP+1 | OP+1 | OP+1 | 0 |
| 23 | OP+2 | OP+2 | OP+2 | 0 |
| 24 | OP+3 | OP+3 | OP+3 | 0 |

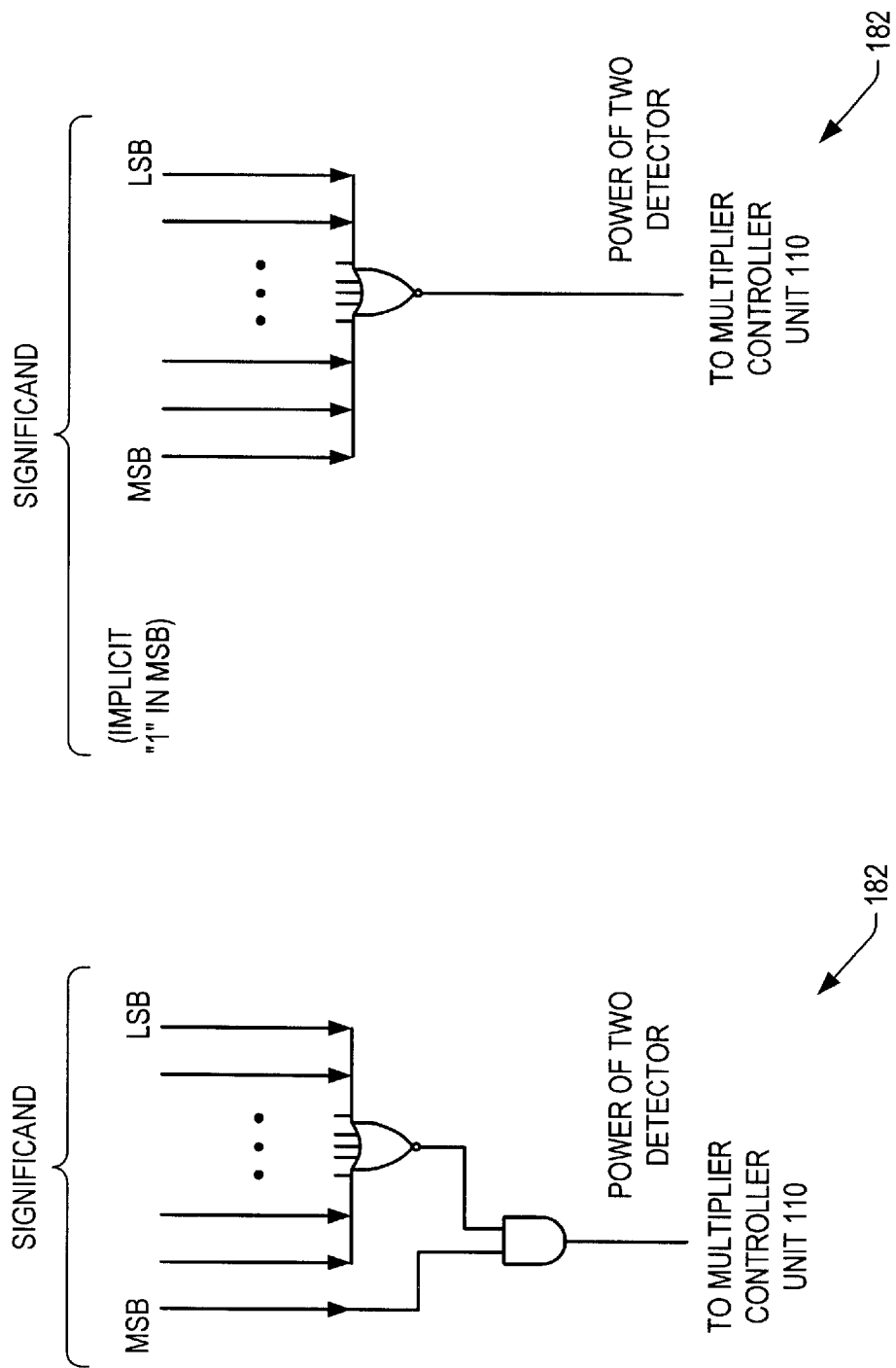

EARLY COMPLETION OF ITERATIVE DIVISION

PRIORITY CLAIM TO PROVISIONAL APPLICATION

This application claims the benefit of U.S. Provisional Application No. 60/098,613, filed on Aug. 31, 1998.

BACKGROUND OF THE INVENTION

1. Field of the Invention

This invention relates generally to the field of microprocessors and, more particularly, to floating point units configured to perform division operations.

2. Description of the Related Art

Microprocessors are typically designed with a number of "execution units" that are each optimized to perform a particular set of functions or instructions. For example, one or more execution units within a microprocessor may be optimized to perform memory accesses, i.e., load and store operations. Other execution units may be optimized to perform general arithmetic and logic functions, e.g., shifts and compares. Many microprocessors also have specialized execution units configured to perform more complex arithmetic operations such as multiplication and reciprocal operations. These specialized execution units typically comprise hardware that is optimized to perform one or more particular arithmetic functions. In the case of multiplication, the optimized hardware is typically referred to as a "multiplier."

In older microprocessors, multipliers were implemented using designs that conserved die space at the expense of arithmetic performance. Until recently, this was not a major problem because most applications, i.e., non-scientific applications such as word processors, did not frequently generate multiplication instructions. However, recent advances in computer technology and software are placing greater emphasis upon multiplier performance. For example, three dimensional computer graphics, rendering, and multimedia applications all rely heavily upon a microprocessor's arithmetic capabilities, particularly multiplication and multiplication-related operations. As a result, in recent years microprocessor designers have favored performance-oriented designs that use more die space. Unfortunately, the increased die space needed for these high performance multipliers reduces the space available for other execution units within the microprocessor. Thus, a mechanism for increasing multiplier performance while conserving die space in needed.

The die space used by multipliers is of particular importance to microprocessor designers because many microprocessors, e.g., those configured to execute MMX™ (multimedia extension) or 3D graphics instructions, may use more than one multiplier. MMX and 3D graphics instructions are often implemented as "vectored" instructions. Vectored instructions have operands that are partitioned into separate sections, each of which is independently operated upon. For example, a vectored multiply instruction may operate upon a pair of 32-bit operands, each of which is partitioned into two 16-bit sections or four 8-bit sections. Upon execution of a vectored multiply instruction, corresponding sections of each operand are independently multiplied. FIG. 1 illustrates the differences between a scalar (i.e., non-vectored) multiplication and a vector multiplication. To quickly execute vectored multiply instructions, many microprocessors use a number of multipliers in parallel.

Another factor that may affect the die space used by multipliers within a microprocessor is the microprocessor's ability to operate upon multiple data types. Most microprocessors must support multiple data types. For example, x86 compatible microprocessors must execute instructions that are defined to operate upon an integer data type and instructions that are defined to operate upon floating point data types. Floating point data can represent numbers within a much larger range than integer data. For example, a 32-bit signed integer can represent the integers between $-2^{31}$ and $2^{31}-1$ (using two's complement format). In contrast, a 32-bit ("single precision") floating point number as defined by the Institute of Electrical and Electronic Engineers (IEEE) Standard 754 has a range (in normalized format) from $2^{-126}$ to $2^{127}{}_x(2-2^{-23})$ in both positive and negative numbers. While both integer and floating point data types are capable of representing positive and negative values, integers are considered to be "signed" for multiplication purposes, while floating point numbers are considered to be "unsigned." Integers are considered to be signed because they are stored in two's complement representation.

Turning now to FIG. 2A, an exemplary format for an 8-bit integer 100 is shown. As illustrated in the figure, negative integers are represented using the two's complement format 104. To negate an integer, all bits are inverted to obtain the one's complement format 102. A constant of one is then added to the least significant bit (LSB).

Turning now to FIG. 2B, an exemplary format for a 32-bit (single precision) floating point number is shown. A floating point number is represented by a significand, an exponent and a sign bit. The base for the floating point number is raised to the power of the exponent and multiplied by the significand to arrive at the number represented. In microprocessors, base 2 is typically used. The significand comprises a number of bits used to represent the most significant digits of the number. Typically, the significand comprises one bit to the left of the radix point and the remaining bits to the right of the radix point. In order to save space, the bit to the left of the radix point, known as the integer bit, is not explicitly stored. Instead, it is implied in the format of the number. Additional information regarding floating point numbers and operations performed thereon may be obtained in IEEE Standard 754. Unlike the integer representation, two's complement format is not typically used in the floating point representation. Instead, sign and magnitude form are used. Thus, only the sign bit is changed when converting from a positive value 106 to a negative value 108. For this reason, some microprocessors use two multipliers, i.e., one for signed values (two's complement format) and another for unsigned values (sign and magnitude format). This places further constraints upon the die space used by each multiplier.

Another crucial factor that may affect the amount of die space allocated to a multiplier is the number of other functions that the multiplier is capable of executing. If a particular multiplier is capable of executing other types of instructions, e.g., division and square root functions, it may be allocated more die space because it alleviates the need for additional hardware, e.g., a dedicated division circuit.

For the reasons set forth above, a method for increasing multiplier performance and utility while conserving die space is needed.

SUMMARY

The problems outlined above may in part be solved by a multiplier configured in accordance with the present invention. In one embodiment, the multiplier may be configured to execute divide-by-two operations and zero dividend operations using fewer multiplication iterations than normal division instructions. As used herein, normal division instructions are division instructions which do not have a zero dividend or integer power of two divisor. In another embodiment, the multiplier may also be configured to perform a back multiplication operation after multiplying the reciprocal of the divisor with the dividend.

In another embodiment, the multiplier is also configured to execute simple independent multiplication operations and complex iterative operations concurrently. The ability to perform iterative calculations advantageously allows the multiplier to perform calculations such as division and square root, thereby reducing die space constraints. The ability to concurrently execute these iterative instructions with multiplications instructions may improve the throughput of the multiplier while reducing the need for using more than one multiplier.

In one embodiment, the multiplier may comprise a plurality of pipeline stages, some of which are idle for particular clock cycles during the execution of a complex iterative operation. The multiplier may be configured to generate a control signal indicative of the occurrence of these idle clock cycles. The control signal may then by used to select and route independent simple multiplication instructions to the multiplier for execution during the idle clock cycles. In another embodiment, the multiplier may also be configured concurrently execute two independent complex iterative calculations. The multiplier's availability during a particular clock cycle to perform a second instruction concurrently may be a function of the type of iterative operation being performed and the number of clock cycles between the particular clock cycle and the first clock cycle during which the multiplier began executing the first complex iterative operation. In some embodiments, the multiplier may be configured to store the intermediate products produced by the iterative calculations. Advantageously, some embodiments of the multiplier may be configured to compress these intermediate products before storing them, further conserving die space.

A method for executing independent multiplication and iterative instructions concurrently is also contemplated. In one embodiment the method comprises beginning execution of an iterative instruction in a pipelined multiplier, wherein the iterative instruction requires a first number of clock cycles to complete. A control signal is asserted during the first number of clock cycles if the multiplier will be available to begin execution of an independent multiplication instruction in a predetermined number of clock cycles. Upon detecting an asserted control signal, an independent multiplication instruction is dispatched to the multiplier. Execution of the independent multiplication instruction may begin and complete before the iterative instruction has completed executing.

In another embodiment, the multiplier may also be configured to perform signed and unsigned scalar and vector multiplication using the same hardware. The multiplier may also be configured to calculate vector dot products. The multiplier may receive either signed or unsigned operands in either scalar or packed vector format and accordingly output a signed or unsigned result that is either a scalar or a vector quantity. Advantageously, this embodiment may reduce the total number of multipliers needed within a microprocessor because it may be shared by execution units and perform both scalar and vector multiplication. This space savings may in turn allow designers to optimize the multiplier for speed without fear of using too much die space.

In yet another embodiment, the multiplier may be configured to output the results in segments or portions, which may be rounded. This may advantageously reduce the amount of interface logic and the number of bus lines that may be needed to support the multiplier.

In still another embodiment, the speed of the multiplier may be increased by configuring the multiplier to perform fast rounding and normalization. This may be accomplished configuring the multiplier to calculate two version of an operand, e.g., an overflow version and a non-overflow version, in parallel.

BRIEF DESCRIPTION OF THE DRAWINGS

Other objects and advantages of the invention will become apparent upon reading the following detailed description and upon reference to the accompanying drawings in which:

FIG. 1 is a diagram illustrating an exemplary scalar multiplication and an exemplary vector multiplication.

FIG. 5A illustrates one embodiment of the shift-and-add algorithm for binary multiplication.

FIG. 5B illustrates one embodiment of Booth's algorithm for binary multiplication.

FIG. 6 is a chart depicting the timing in one embodiment of the multiplier from FIG. 3.

FIG. 8 is a chart depicting one embodiment of the timing of the multiplier from FIG. 7.

FIG. 9 is a diagram illustrating one embodiment of which inputs are selected during iteration clock cycles.

FIGS. 11A–B are diagrams illustrating embodiments of the divide-by-two detection unit from FIG. 10.

Figures 2A, 2B:
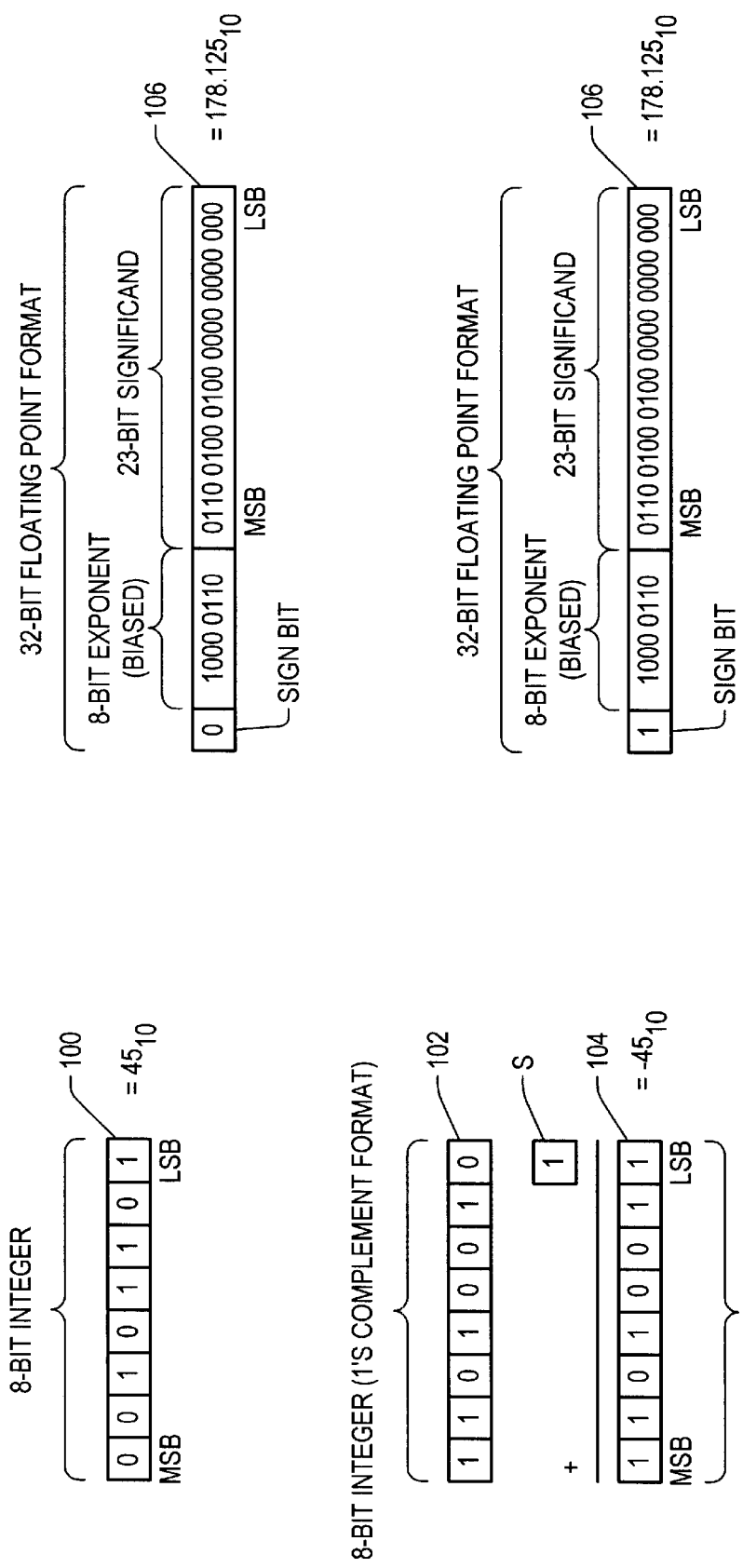
FIG. 2A is a diagram of an exemplary integer data format using two's complement representation.
FIG. 2B is a diagram of an exemplary floating point data format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 3:
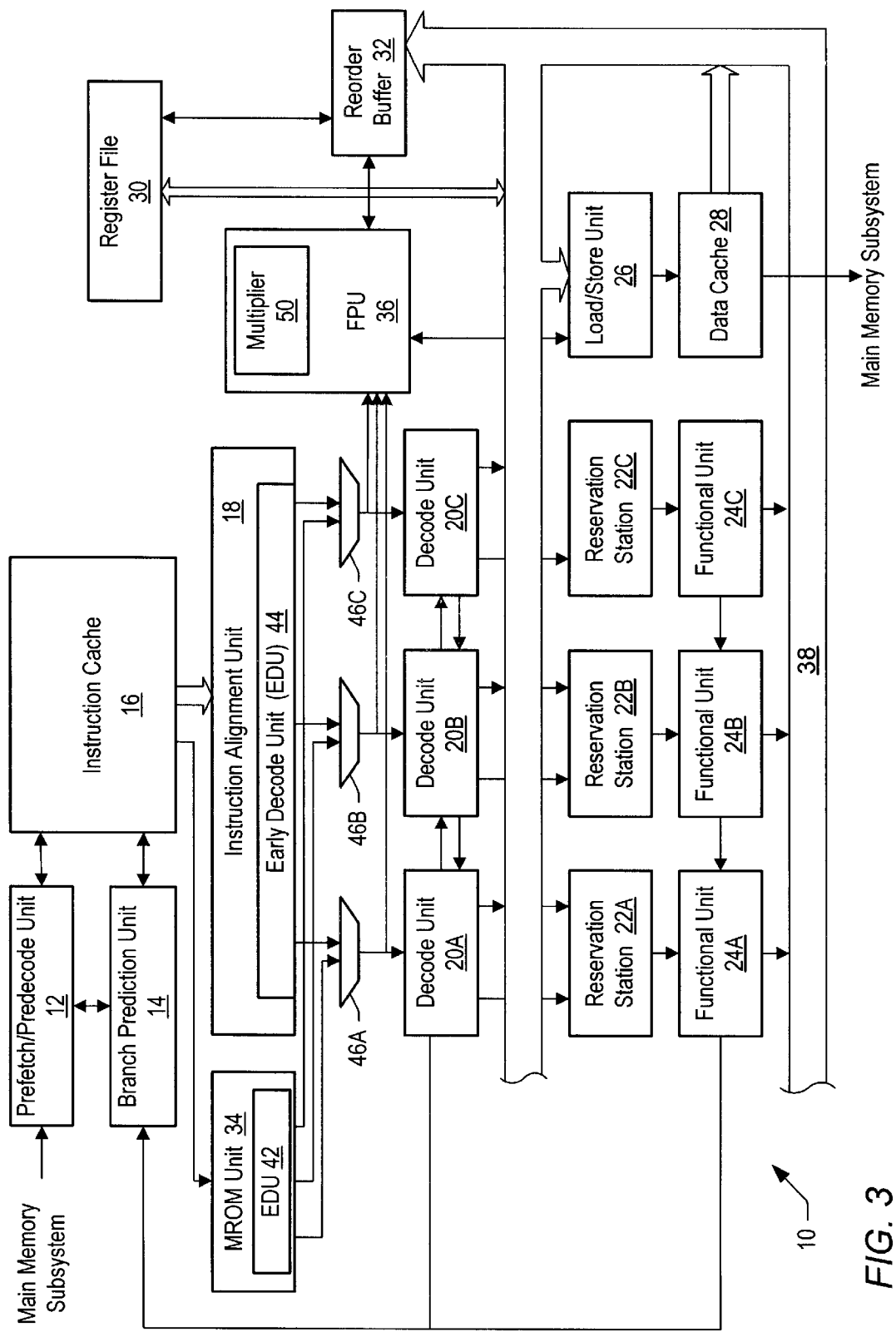
FIG. 3 is a block diagram of one embodiment of an exemplary microprocessor.

Turning now to FIG. 3, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36, which in turn comprises multiplier 50. Before examining one embodiment of multiplier 50 in detail, the operation of microprocessor 10 will be briefly discussed. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4-way set associative structure having 32-byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 may predict the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (floating point, MMX, and 3D instructions). In one embodiment of microprocessor 10, up to three floating point instructions per clock cycle may be conveyed to floating point unit 36. As note above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 3, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is fill, the decode units wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Floating Point Unit

Figure 3A:
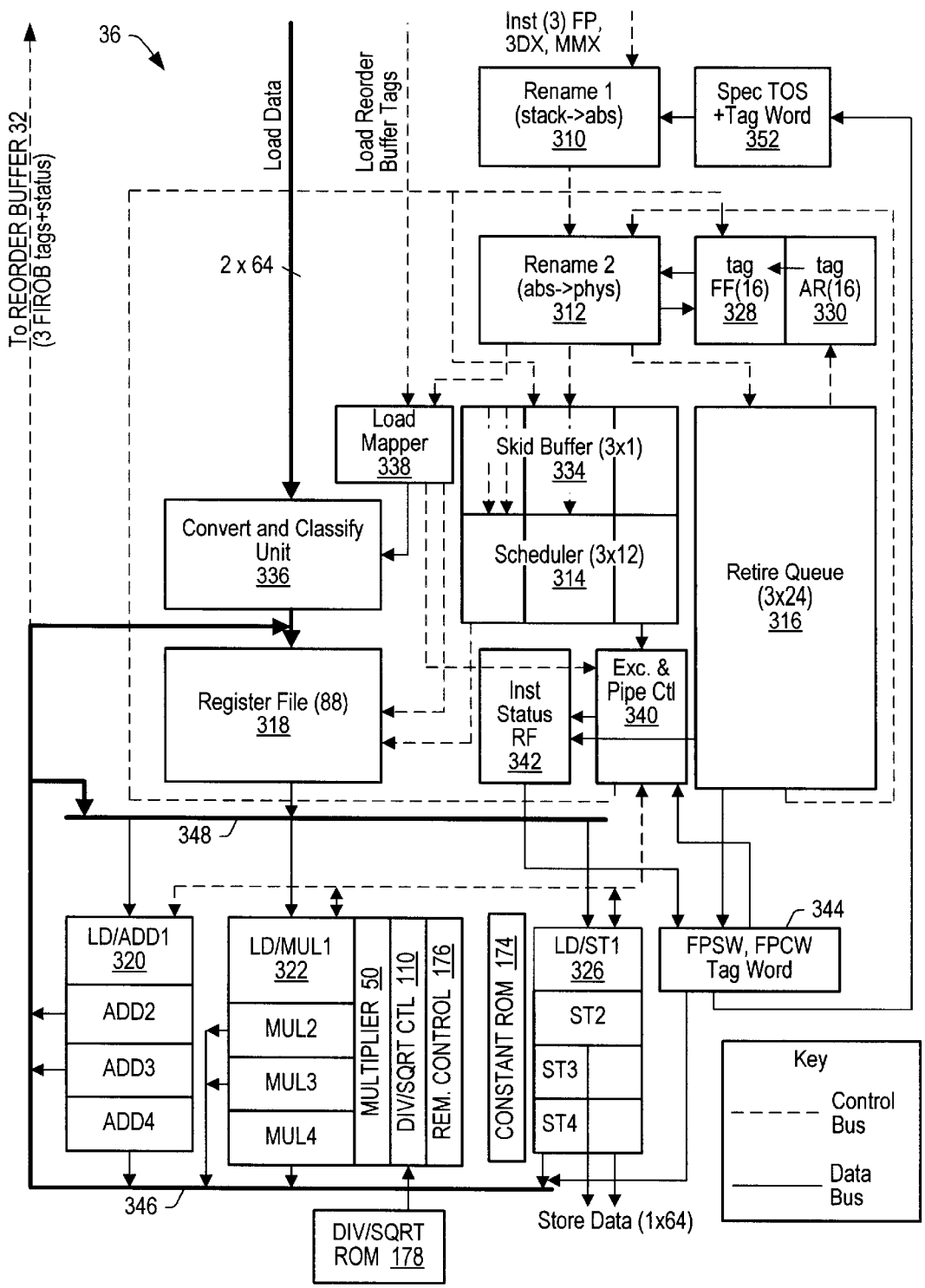
FIG. 3A is a block diagram of one embodiment of the floating point unit from the microprocessor of FIG. 3.

Turning now to FIG. 3A, details of one embodiment of FPU 36 are shown. FPU 36 is a high performance out-of-order execution unit capable of accepting up to three new instructions per clock cycle. The three instructions may be any combination of x86 floating point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add instruction pipeline 320, a load/multiply instruction pipeline 322, a load/store instruction pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipe control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to instruction pipes 320, 322, and 326. Finally, instruction pipes 320, 322, and 326, and floating point status/control/tag words 344 are all coupled to result bus 346. While floating point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipe control unit 340, or retire queue 316.

Rename-1 unit 310 receives up to three instructions per clock cycle. As previously noted, these may be any combination of floating point, MMX, or 3DX instructions. Rename-1 unit 310 converts stack-relative register operands into absolute register operands. The x86 instruction set and architecture defines eight floating point registers that are accessed in a stack-like manner (i.e., relative to a top-of-stack pointer). For instructions with memory operands, e.g., FLD instructions (floating point load), no conversion is necessary. Instead, the sources are simply identified as being memory operands rather than register operands. Rename-1 unit 310 also assigns each instruction to one of three instruction pipelines, either load/store pipeline 326, add pipeline 320, or multiply pipeline 322.

Rename-2 unit 312 performs true register renaming. Upon receiving the instructions from rename-1 unit 310, rename-2 unit 312 reads three registers from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating point stack or MMX registers) and eight are micro-architectural registers (i.e., registers that store internal state information that is not generally accessible to the programmer). The old destination registers are then read from the tag future file 328 and written to the tail of the free list. Finally, tag future file 328 is updated by storing tags for the new destination registers.

Memory operands may be handled by assigning them the same register tag as the destination register. This is because load data will be converted and directly written into the destination register when it is received from load/store pipeline 326. In the case of an FLD instruction, no further execution may be needed, although the FLD instruction is still assigned to an execution pipeline for the purpose of signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Concurrently with allocating the line of storage and snooping, retire queue 316 allocates one entry for each instruction. The entries store the destination register tags, the absolute destination register number, and the old destination register number. Additional information may also be included, e.g., information that may be needed to update the architectural state at retire time.

On the cycle following their entry into scheduler 314, the instructions are available for scheduling. Scheduler 314 examines all of the stored instructions and issues the oldest instructions which meet the following criteria: (1) the instruction pipe to which the instruction has been assigned is available, (2) the result bus for that instruction pipe will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. Each of the three instruction pipes 320, 322, and 326 may accept a new instruction every clock cycle. Note other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding. Result forwarding involves conveying the results from a recently executed instruction directly to other instructions that depend upon that result. Using result forwarding allows the result to be used in subsequent instructions without having to wait for the result to be stored in a register and then read from the same register.

Each instruction execution pipe 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each instruction pipe may begin performing the appropriate computation.

In the embodiment shown in the figure, instruction pipe 320 is configured to perform load and addition operations, instruction pipe 322 is configured to perform load and multiplication operations, and instruction pipe 326 is configured to perform load and store operations. Both instruction pipes 320 and 322 may be configured to perform certain MMX instructions. Instruction pipe 322, which comprises multiplier 50, may also be configured to perform iterative calculations that involve multiplication, e.g., reciprocal operations, division operations, and square root operations, under the control of control unit 110, division/square root ROM 178, and, if a remainder is called for, remainder control unit 176. Constant ROM 174 is a read only memory configured to store a plurality of constants that may be used to calculate initial values for these iterative calculations. Division/square root ROM 178 is a read only memory which stores sequence information for division and square root functions, as described in greater detail below. Note, in some embodiments control unit 110 may be part of execution and pipe control unit 340.

In some cases, instruction operands or the results generated by executing an instruction may be too small to fit within the operand or result's standard data format. These numbers are referred to as "denormals". While normalized floating point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated by during execution within instruction pipes 320, 322, and 326 are tagged when they are generated. Execution and pipe control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the characteristics of each data type for x86 compatible floating point units (wherein "x" represents either a one or a zero):

| Sign | Exponent | Significand | Value |
| --- | --- | --- | --- |
| x | $00...00_2$ | $0.00...00_2$ | Zero |
| x | $11...11_2$ | $1.00...00_2$ | Infinity |
| x | $11...11_2$ | $1.1xx...xx_2$ | QNaN |
| x | $11...11_2$ | $1.0xx...xx_2$ | SNaN |
| x | $00...00_2$ | $0.xx...xx_2$ | Denormal |

MMX data types are 64 bits wide and comprise either eight packed 8-bit bytes, four packed 16-bit words, or two packed 32-bit double-words. MMX data types may be detected by the MMX opcodes which precede them. Normal data types are standard floating point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a signific and in the format (f.ff . . . ff) of 0.11 . . . 11 is an unsupported value. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significant portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed in parallel to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a data register tag. The data register tag indicates which data register within register file 318 the corresponding data is to be loaded into.

Execution and pipe control unit 340 tracks the status of each stage in instruction pipes 320, 322, and 326. Execution and pipe control unit 340 contains timing information enabling it to determine the future availability of each instruction pipe. For example, when an FMUL (floating point multiply) instruction begins execution in multiplication instruction pipe 322, control unit 340 uses its stored timing information to notify scheduler 314 that the result will be available for output on result bus 346 four clock cycles later. This timing information allows scheduler 314 to efficiently schedule instruction for execution in instruction pipes 320, 322, and 326. Control unit 320 also tracks the status of each pipe stage, receiving and prioritizing exceptions from instruction pipes 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 of them store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipe control unit 320. As a result of instructions executing out of order in FPU 36, exceptions that occur within instruction pipes may need to be stored until the instructions generating them are the next to be retired. Retire queue 316 reads instruction status register file 342 when it retires instructions and updates the architectural floating point status word (FPSW) and floating point control word (FPCW) and tag word (collectively, 344) accordingly. This information is conveyed to rename-1 unit along with the current speculative top of stack 352 and on result bus 346.

details of one Embodiment of Multiplier 50

Figure 4:
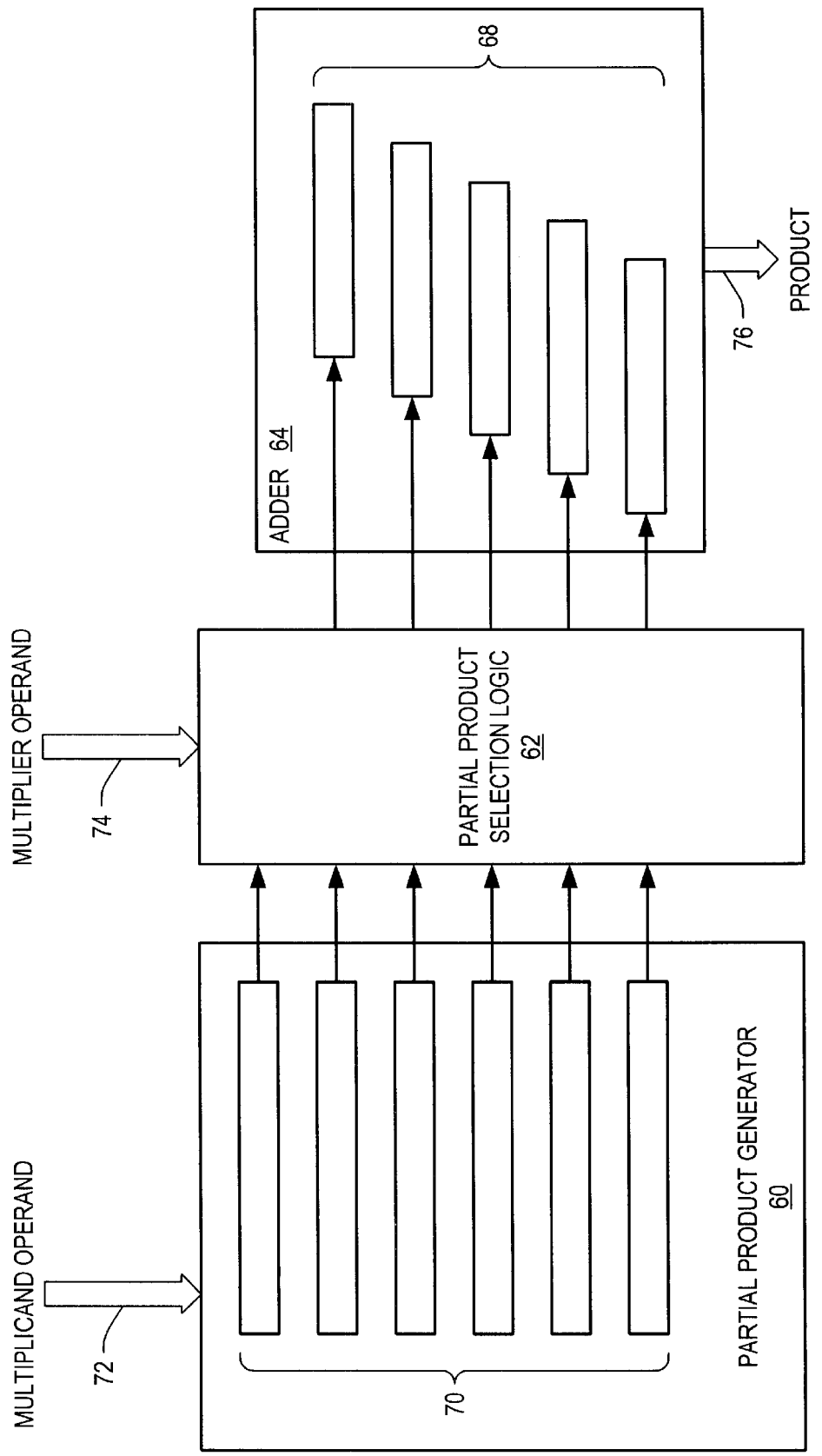
FIG. 4 is a block diagram illustrating details of one embodiment of the multiplier from FIG. 3.

Turning now to FIG. 4, more detail of one embodiment of multiplier 50 is shown. In this embodiment, multiplier 50 comprises a partial product generator 60, a partial product selection logic unit 62, and an adder 64. As shown in the figure, partial product generator 60 is coupled to selection logic unit 62, which is in turn coupled to adder 64. When one of execution units 36C–36E receives an instruction invoking the multiplication function, the execution unit conveys two operands to multiplier 50, i.e., a multiplicand operand 72 and a multiplier operand 74. Partial product generator 60 is coupled to receive multiplicand operand 72, which is used as a starting value for calculating a plurality of partial products 70. For example, if partial product generator 60 is configured to use the 2-bit version of Booth's algorithm, the following partial products would be generated: the multiplicand itself ("+M"), a shifted version of the multiplicand ("+2M"), an inverted version of the multiplicand ("−M"), a shifted and inverted version of the multiplicand ("−2M"), and two constants, i.e., a positive zero ("+0") and a negative zero ("−0") in two's complement form.

Partial product selection unit 62 is coupled to receive multiplier operand 74. Selection unit 62 is configured to select a number of partial products from generator 60 based upon particular fields within multiplier operand 74. For example, using the 2-bit version of Booth's algorithm, multiplier operand 74 is padded with leading and trailing zeros (assuming an unsigned multiplication is being performed), and then one partial product is selected by each 3-bit field within the operand.

Finally, adder 64 is configured to receive and sum the partial products selected by selection unit 62. As noted in the figure, the selected partial products 68 are shifted before they are summed. The resulting final product 76 is output to the execution unit that transmitted the operands.

While multiplier 50 may be configured to perform multiplication using a number of different algorithms, the embodiment shown in the figure is configured to use a modified version of Booth's Algorithm to improve multiplication times. Booth's algorithm relies upon calculating a number of partial products and then summing them to obtain a final product. Booth's algorithm is able to improve multiplication times over the standard "add-and-shift" algorithm by reducing the number of partial products that need to be summed in order to obtain the final product. For example, in performing an 8-bit by 8-bit multiplication, the shift-and-add algorithm generates eight partial products. By contrast, same 8-bit by 8-bit multiplication using the 2-bit version of Booth's algorithm generates only five partial products. This reduction in the number of partial products is illustrated in FIGS. 5A and 5B.

Note that multiplier 50 may be configured to use other algorithms, e.g., a shift-and-add algorithm or a 3-bit version of Booth's algorithm. Furthermore, multiplier 50 may be configured to accept and calculate differing bit-widths of operands, e.g., 32, 64, 80, and 87 bits. Higher bit widths such as 87-bits and 90-bits may be used internally in the multiplier for greater precision.

Algorithms for Iterative Calculations

In order to further conserve die space, multiplier 50 may be configured to perform other calculations in addition to multiplication. For example, multiplier 50 may be configured to perform division and square root operations. To allow multiplier 50 to perform division, division operations may be written as the product of the dividend and the reciprocal of the divisor, or $$Q=a/b=a\cdot(1/b), \quad (1)$$

where Q is the quotient, a is the dividend, and b is the divisor. In this case, the challenge becomes how to efficiently compute the reciprocal of the divisor. The following sections derive two possible iterative algorithms that may be used to determine the reciprocal. Note these derivations are presented for explanatory purposes and are not meant to be limiting. Other iterations are possible and contemplated.

Fast Newton-Raphson Iteration to Calculate the Reciprocal (1/B)

As microprocessor 10 already contains a highly optimized multiplier 50, it would be advantageous to perform other calculations on multiplier 50 as well, e.g., division. This may be accomplished by recasting division operations into reciprocal operations followed by multiplication operations. For example, the operation "A divided by B" (A/B) may be recast into "A multiplied by the reciprocal of B" (A×B$^{-1}$). Forming the reciprocal of B may also be recast into a series of multiplication operations by using a version of the Newton-Raphson iteration. The Newton-Raphson iteration uses the equation $X_1=X_0\times(2-X_0\times B)$ to calculate the reciprocal of B. The initial estimate, $X_0$, may be determined in a number of different ways. For example, $X_0$ may be read from a ROM table using B as the index, wherein $X_0$ approximates 1/B. In another embodiment, $X_0$ may be calculated directly from B or from one or more ROM tables configured to output seed values. The seed values may be manipulated, e.g., using arithmetic and combinational logic, to determine $X_0$. Once $X_0$ is known, the first iteration may be performed. Thereafter, the results from each iteration are used in place of $X_0$ in subsequent iterations. This forces $X_{n+1}$ to converge on 1/B in a quadratic fashion.

The Newton-Raphson algorithm converges to a reciprocal, which is then multiplied by the dividend to compute the quotient. In contrast, series expansions first prescale the numerator and the denominator by the starting approximation and then converges directly to the quotient. Each iteration in both algorithms comprises two multiplications and a two's complement operation. It is evident that the multiplications in Newton-Raphson are dependent operations. As a result of the sequential nature of the operations, the latency of this algorithm is higher than that of the series expansion algorithm. This latency is illustrated in greater detail below. In the series expansion implementation, the two multiplications of the numerator and denominator are independent operations and may occur in parallel. As a result, the series expansion implementation may be better able to take advantage of a pipelined multiplier to obtain higher performance in the form of lower latency per operation.

However, a second important difference is that the Newton-Raphson iteration is self-correcting. Any error in computing $X_i$ can be corrected in subsequent iterations. In contrast, the series-expansion implementation computes the result as the product of independent terms. Therefore, the errors present in each term are not corrected. To account for this error, the multiplications may require extra bits of precision.

Square Root

Fast Newton-Raphson Iteration to Calculate the Reciprocal Square Root (1/√B)

Multiplier 50 may also be configured to calculate the reciprocal square root of an operand B using a modified version of the Newton-Raphson iteration. The equation $Y_{n+1}=Y_n\times(3-B\times Y_n^2)/2$ may be used to calculate the reciprocal square root of B. Once again, the initial estimate, $Y_0$, may be determined in a number of ways, e.g., by using initial estimate generators that perform calculations on seed values read from ROM tables using B. In this iteration $Y_0$ approximately equals 1/√B. Each subsequent iteration of the equation forces $Y_{n+1}$ to converges on 1/√B in a quadratic fashion. In one embodiment, both $Y_0$ and $Y_0^2$ may be produced using the same initial estimate generator that was used for the reciprocal calculation described above. This may be desirable because determining $Y_0^2$ may eliminate the need for a multiplication operation to form $Y_0^2$ from $Y_0$. As used herein, an initial estimate generator refers to any hardware capable of generating an initial value such as $X_0$ or $Y_0$, e.g., one or more ROM tables configured to output seed values that may be used to calculate the initial value using arithmetic and combinational logic.

Concurrent Execution

As described in the previous section, iterative calculations for performing operations such as division and square root involve several sequential multiplication operations which converge toward the desired result. These multiplication operations, along with other operations in the iteration, may monopolize the multiplier for a substantial number of clock cycles. As previously noted, this may be particularly true of implementations that use the Newton-Raphson iteration.

Monopolization of the multiplier is undesirable because other independent multiplication operations may be blocked from execution while the iterative calculation is being performed. For example, if three iterations are performed and each iteration requires two multiplications, then the multiplier is "blocked" for a total of six clock cycles (assuming each multiply operation requires one clock cycle).

A factor which may aggravate this situation is pipelining within the multiplier. In order to achieve a higher clock frequency and greater throughput, multipliers may be pipelined. Using multiplier 50 of FIG. 4 as an example, partial product generation and selection may be performed in the first pipeline stage, partial product addition may occur in the second and third pipeline stages, and rounding may be performed in the fourth pipeline stage. While pipelining may increase a multiplier's average throughput, it may also have the undesirable effect of increasing the blocking penalty for iterative calculations. Using the previous example, a four-stage pipelined multiplier performing three iterations that each require two multiplications, may block independent multiplication instructions for ten or more clock cycles (assuming each pipeline stage requires one clock cycle).

Turning now to FIG. 6, a chart illustrating this blocking phenomena is shown. The chart depicts the timing relationship between pipeline stages for a multiplier having a four stage pipeline during execution of an extended precision division instruction. Execution of the instruction requires a total of twenty-four clock cycles. The first three clock cycles (not shown) are used to read in operands A and B and determine initial estimate $X_0$. As the figure illustrates, first iteration 90 requires four clock cycles to complete. First iteration 90 comprises a first multiplication operation, $D_0=X_0 \times B$, an inversion operation, $R_0=(D_0)^{-1}$ and a second multiplication operation, $N_0=A \times X_0$. Second iteration 92 also comprises a first multiplication operation, $D_1=D_0 \times R_0$, an inversion operation, $R_1=(D_1)^{-1}$, and a second multiplication operation, $N_1=N_0 \times X_0$. The blocking phenomena is aggravated because the second iteration 92 may not begin executing until the results from the first iteration 90, namely $D_0$ and $R_0$, are known. As a result, one or more pipeline stages within the multiplier may sit idle, effectively stalling because of the inherent delays in the iterative calculation. Each multiplier pipeline stage sits idle between performing the first and second iterations. This is illustrated by shaded blocks 86a–d.

In one embodiment, multiplier 50 may be configured to remedy this problem by concurrently executing complex iterative calculations and simple independent multiplication operations. As used herein, "simple" and "independent" refer to multiplication operations that are not part of an iterative calculation and that are ready to be executed, i.e., without unresolved operand dependencies.

Figure 7:
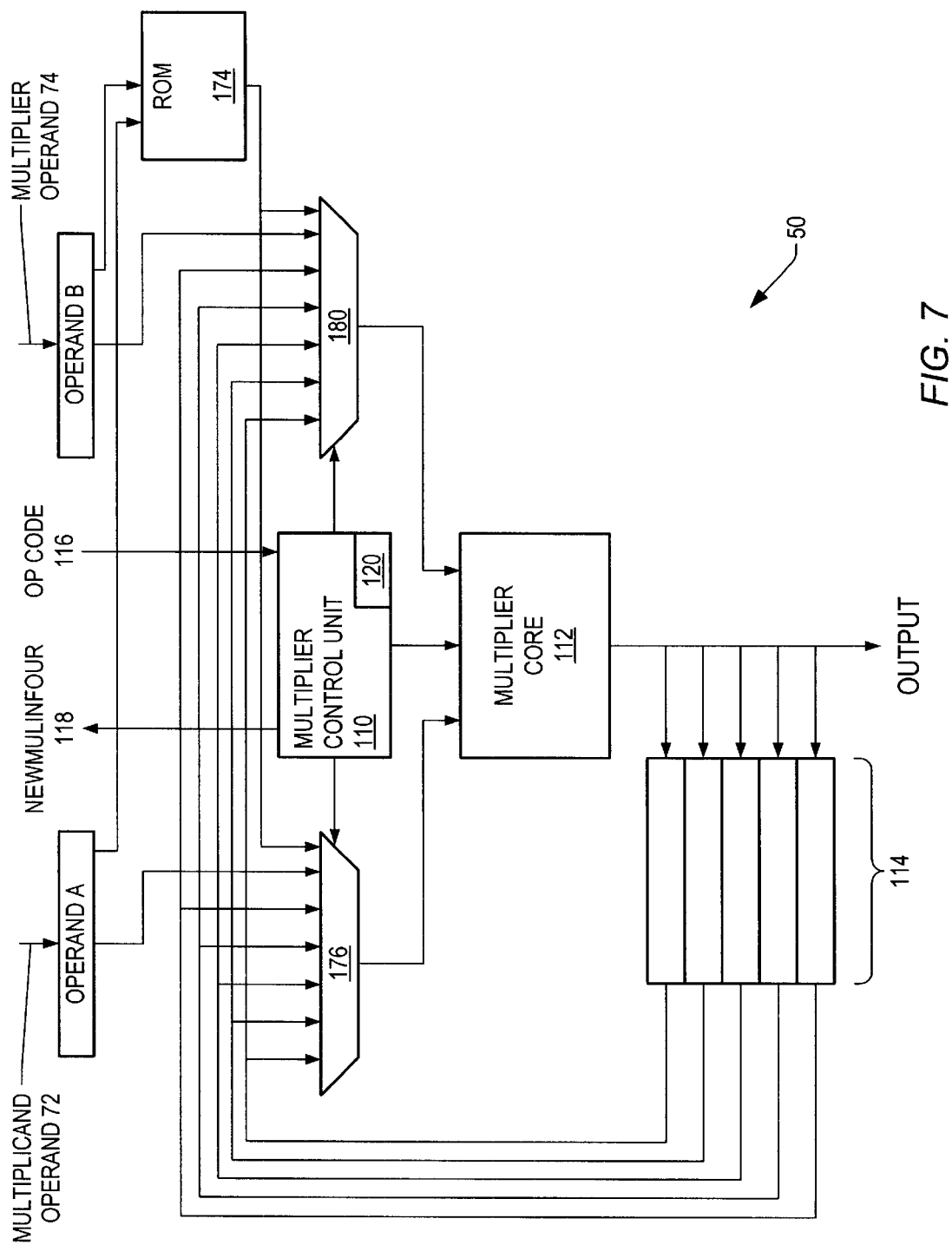
FIG. 7 is a block diagram of one embodiment of the multiplier from FIG. 3 that is configured to concurrently execute instructions.

Turning now to FIG. 7, one embodiment of multiplier 50 configured to concurrently perform complex iterative calculations and independent multiplication operations is shown. In this embodiment, multiplier 50 comprises multiplier control unit 110, a multiplier core 112, a read-only memory ("ROM") 174, a plurality of storage registers 114, and two multiplexers, 776 and 780. Multiplier core 112 may comprise a number of different components. For example, multiplier core 112 may comprise components from multiplier 50 as illustrated in FIG. 4, e.g., partial product generator 60, partial product selection logic 62, and partial product array adder 64. Other known configurations for multiplier core 112 may also be used, e.g. a standard multiplier using an add and shift algorithm. In this embodiment, multiplier core 112 is pipelined and comprises four pipelined stages. Once again, however, other numbers of pipeline stages are possible, e.g. six pipeline stages.

In addition to multiplier core 112, multiplier 50 also comprises two operand inputs, multiplicand input 72 and multiplier input 74. Each of these inputs is coupled to a respective multiplexer 776 or 780. Storage registers 114 and ROM 174 are also coupled to multiplexers 776 and 780. Multiplexers 776 and 780 are controlled by multiplier control unit 110 and are configured to select which inputs will be multiplied by multiplier core 112. Multiplier control unit 110 directs multiplexers 776 and 780 to select appropriate values for input to multiplier core 112 based upon opcode 116 and an internal clock cycle counter 120. As in previous embodiments, ROM 174 is configured to receive an operand as input and output a corresponding initial estimate $X_0$ of the result. ROM 174 may also receive all or a portion of opcode 116 to indicate which table to access if multiple iterative functions are supported in multiplier 50. Note that in some embodiments, the value output by ROM 174 may require further calculation before it is used. In still other embodiments, part or all of ROM 174 may be replaced with combinatorial and arithmetic logic configured to calculate an initial estimate.

Multiplier core 112 receives the selected input values from multiplexer 776 and 780. Multiplexer core 112 multiplies these input values as directed by multiplier control unit 110. For example, if opcode 116 indicates that a simple multiplication operation is to be performed, then multiplier control unit 110 directs multiplier core 112 to multiply the inputs provided by multiplexers 776 and 780 and output the results. If, however, opcode 116 indicates that an iterative calculation is to be performed, then multiplier core 112 performs the first step of the iteration. For example, multiplier core 110 may multiply the selected inputs from multiplexers 776 and 780, and then store both an inverted and non-inverted version of the intermediate results in storage registers 114. During the next iteration, multiplier control unit 110 may cause multiplexers 776 and 780 to select the corresponding results from storage registers 114 for multiplication.

In order to allow complex iterative calculations and simple independent multiplication operations to execute concurrently, multiplier control unit 112 may be configured to initialize internal counter 120 upon receiving an opcode 116 that corresponds to an iterative calculation. Upon receiving such an opcode, multiplier control unit 110 may access an internal ROM or internal logic structure that stores the sequence of operations that comprise the particular opcode. Because the instruction and timing sequence for each type of iterative calculation is constant, control unit 110 is able to assert control signal NEWMULINFOUR 118 four clock cycles before the first pipeline stage in multiplier core 110 experiences an idle cycle. The four cycle advanced notice provided by NEWMULINFOUR 118 allows control logic outside multiplier 50 to select independent multiplication instructions that are ready to be executed. These instructions are then dispatched to multiplier 50 during the appropriate clock cycle. When multiplier 50 receives the opcode 116 corresponding to an independent multiplication instruction, it directs multiplexers 776 and 780 to select the corresponding operands and multiplier core 112 to execute the instruction during the idle cycles within the iterative calculation. A detailed example of the operation of multiplier control unit 110 is explained below.

Turning to FIG. 8, a chart illustrating the operation of an embodiment of multiplier 50 configured to allow concurrent execution of complex iterative calculations and simple independent multiplication operations is shown. Assuming opcode 116 reveals an iterative division calculation is to be performed, multiplier control unit 110 resets internal counter 120 to indicate the first clock cycle. During this first clock cycle, ROM 174 begins to access the initial estimate corresponding to operand B and the particular opcode 116. As previously noted, the first multiplication operation of the iterative calculation begins on the fourth clock cycle, reflecting the read access time of ROM 174 and any time that may be used to calculate $X_0$ from the output of ROM 174 if ROM 174 does not explicitly store $X_0$ in a useable form. Multiplier control unit 110 does not assert NEWMULINFOUR 118 during this first clock cycle because the first stage of the pipeline in multiplier core 112 will not be available to begin executing an independent simple multiplication instruction during the fifth clock cycle, i.e., it will be busy performing the second multiplication of the first iteration, $N_0=A \times X_0$. In some embodiments, multiplier core 112 may be configured to execute independent instructions (and complete previous operations) while waiting for $X_0$ to be generated. These previous and or independent instructions are represented in the figure by instruction blocks 142A–F. Multiplier 50 may also be configured to store operands A and B for later use, e.g., during clock cycles 4–5 and 21. Operands A and B may be store within storage registers 114 or in separate dedicated registers for inputs 72 and 74.

During the second clock cycle, however, multiplier control unit 1 10 does assert NEWMULINFOUR 118. This is because the first stage of the pipeline in multiplier core 112 will be available to begin executing an independent simple multiplication instruction during the sixth clock cycle. In response to the asserted signal NEWMULINFOUR 118, control logic external to multiplier 50 may efficiently analyze pending operations and schedule the next independent multiplication instruction that is available for execution. Note that in some embodiments this external control may speculatively issue instructions out of program order, while in other embodiments program order may be followed more strictly.

During the third clock cycle, $X_0$ is output by ROM 174, and multiplier control unit 110 causes multiplexer 776 to select $X_0$ from ROM 174 and multiplexer 780 to select operand A from multiplier input 74. Once again, multiplier control unit 110 asserts NEWMULINFOUR 118. This is because the first stage of the pipeline in multiplier core 112 will be available to begin executing an independent simple multiplication instruction during the seventh clock cycle.

During the fourth clock cycle, the first pipeline stage of multiplier core 112 begins performing the first multiplication of the first iteration, $D_0=X_0 \times B$. This multiplication takes four clock cycles to complete. Multiplier control unit 110 does not assert NEWMULINFOUR 118 during this fourth clock cycle because the first stage of the pipeline in multiplier core 112 will not be available to begin executing an independent simple multiplication instruction during the eighth clock cycle, i.e., it will be busy performing the first multiplication of the second iteration, $D_1=D_0 \times R_0$. During the fifth clock cycle, multiplier control unit 110 causes multiplexer 776 to select operand A from multiplicand input 72 and multiplexer 780 to select $X_0$. Under the direction of multiplier control unit 110, the first stage of multiplier core 112 begins performing the second multiplication in the first iteration of the division calculation, i.e., $N_0=A \times X_0$. Once again, this multiplication takes four clock cycles to complete. Thus, multiplier core 112 will complete the first iteration after clock cycle eight. Meanwhile, also during the fifth clock cycle, the first multiplication of the iteration, $D_0=X_0 \times B$, has propagated to the second stage of the pipeline. Note that one clock cycle of overlap between iterations is possible because the first multiplication of an iteration does not rely upon the results of the second multiplication from the previous iteration. For example, the first multiplication of the second iteration, $D_1=D_0 \times R_0$, does not depend upon $N_0$.

During the sixth clock cycle, external logic conveys to multiplier 50 the opcode and operands for the first independent simple multiplication operation to be performed concurrently with the complex iterative calculation currently underway. Accordingly, multiplier control unit 110 may be configured to direct the first pipeline stage within multiplier core 112 to begin execution of this independent instruction.

Advantageously, in this embodiment ten independent simple multiplications (represented by shaded instruction blocks 148A–D) may be performed concurrently with the iterative operation. As a result, the benefits of pipelining may be had without incurring the undesirable blocking effects. Concurrently with the execution of the final calculation of the iterative division, REM=Q×B−A, additional multiplication instructions may be performed. These instructions are represented in the figure by instruction blocks 144A–C (see clock cycles 22–24).

Turning now to FIG. 9, a diagram illustrating which inputs are selected by one embodiment of multiplexers 776 (SrcA) and 780 (SrcB) during particular clock cycles during the iteration are shown. Note that these selections are exemplary and represent an extended precision multiplication. Other configurations and other iterations are possible.

Additional embodiments of multiplier 50 are also contemplated. For example, in one embodiment, multiplexers 776 and 780 may be configured to select multiplicand input 72 and multiplier input 74 by default. Multiplexers 776 and 780 may be configured to select other values, i.e., from storage registers 114 or ROM 174, only upon receiving an indication from multiplier control unit 110.

In yet another embodiment, multiplier 50 may be configured to perform two or more unrelated iterative calculations concurrently. For example, if storage registers were large enough to store the information (two copies of some information), two different iterative operations could be performed concurrently by multiplier 50. This may require more complex logic and timing within multiplier control unit 110. Note that control unit 110 may comprise a separate state machine and sequencer for each iterative calculation being concurrently performed.

Early Completion

While the embodiments described above may advantageously reduce or eliminate the number of idle clock cycles in each stage of the multiplier pipeline, further improvements in division performance are still desirable. In particular, examination of the types of operations executed on floating point units indicates that it would be advantageous to reduce the latency for certain types of operands, e.g., division of a floating point number by a integer power of two (referred to herein as "division-by-two", and division of zero.

Division-by-two operations may result in a simple reduction of the dividend's the exponent, i.e., leaving the significand unchanged. Accordingly, in one embodiment multiplier 50 is configured to perform such an operation with a much lower latency than a typical division computation. In x87-compatible embodiments, however, floating point operations may be slightly more complicated because the significand itself may be conditionally rounded to a lower precision based upon the floating point control word 344.

Since multiplier 50 is capable of executing instructions out-of-order and can tolerate variable latency, some embodiments may be configured to support division operations with variable latencies. In this embodiment, multiplier control unit 110 is configured to notify central scheduler 314 a fixed number of cycles in advance of when division or square root operations will complete. As described above, scheduler 314 uses this information to schedule dependent operations and subsequent division or square root instructions. If the latency is at least as long as the notification period, divides and square roots may be any number of cycles.

For example, in one embodiment multiplier 50 is configured to complete the computation of quotients where the divisor is an integer power-of-two in only eleven cycles, regardless of the target precision. The exponent adjustment (if necessary) occurs during the initial approximation lookup phase, while the rounding of the significand occurs using the LASTMUL and BACKMUL ops (see below). Assuming for example a minimum notification time for scheduler 314 of seven cycles, this latency is acceptable. Division operations with dividends that are exactly zero are also handled by this mechanism. To simplify the implementation, they use the same sequence of events, returning a zero result in 11 cycles, regardless of the target precision. Divide by two and division of zero are discussed in greater detail below.

As previously noted, division operations are recast into multiplication operations by first calculating the reciprocal of the multiplicand and then multiplying the reciprocal with the multiplier. In the embodiments described above, the reciprocal is calculated using an iterative process that involves a number of multiplications. In one embodiment of multiplier 50, division by powers of two operations are executed by forming the reciprocal of the power of two in two iterations through multiplier core 112 instead of the normal five iterations (see e.g., FIG. 6). Similarly, division operations that have a zero dividend may also be executed using two or less iterations through multiplier core 112. Reducing the number of iterations used for these special case operations may advantageously improve the performance of multiplier 50.

Figure 10:
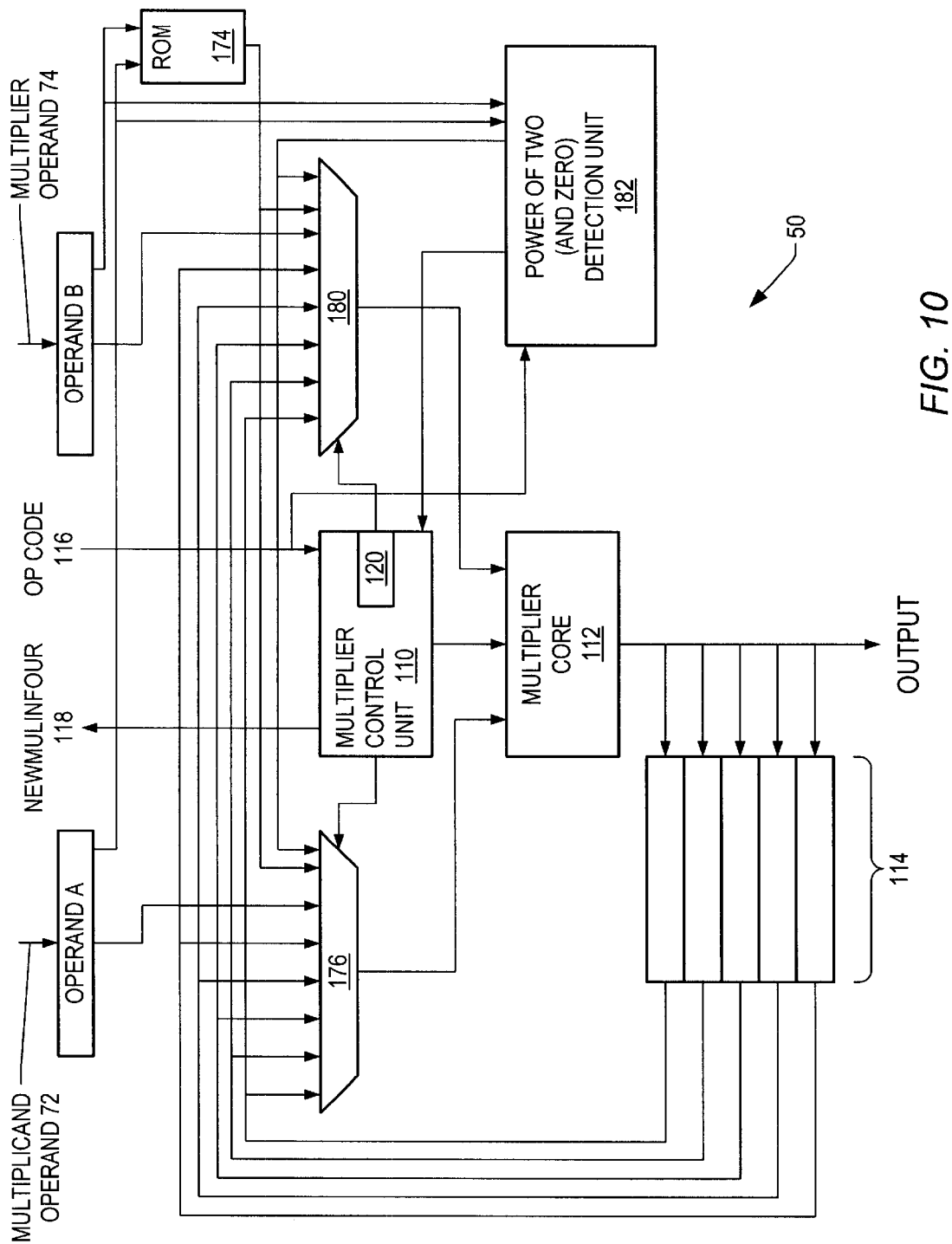
FIG. 10 is a diagram illustrating another embodiment of the multiplier from FIG. 3.

Turning now to FIG. 10, one embodiment of multiplier 50 configured to calculate the reciprocal of integer powers of two in a single iteration is shown. In the embodiment shown, multiplier 50 further comprises detection unit 182. Detection unit 182 is coupled to receive multiplicand operand 72, multiplier operand 74, and opcode 116 as inputs. Based upon these inputs, detection unit 182 is configured to detect two types of operations that may be optimized through early completion: (1) divide operations having a divisor that is an integer power of two, and (2) divide operations that have a dividend of zero. Upon detecting one of these two types of operations, detection unit 182 is configured to notify multiplier control unit 110 of which type of operation is to be execute. In the case of a divide by two operation, detection unit 182 is also configured to provide one of multiplexers 176 and 180 with the exact reciprocal as an initial estimate (i.e., to be selected in place of the estimate generated by ROM unit 174). As previously noted, multiplier control unit 110 may be configured to route the appropriate operands through multiplier core 112 for the final two iterations of a divide instruction. These two iterations correspond to the LASTMUL (represented by cycle 94 in FIG. 6) and BACKMUL (represented by cycle 98 in FIG. 6) operations. Note, multiplier control unit 110 may also be configured to direct multiplexers 176 and 180 to select the appropriate inputs from detection unit 182.

Turning now to FIG. 11A, details of one embodiment of detection unit 182 are shown. In order to detect division operations having divisors that are integer powers of two, the divisor's significand is examined using the illustrated circuit. Assuming the divisor is normalized, divisors that are integer powers of two will have significands with a one the most significant bit and zeros in all remaining bits. In one embodiment, the sign bit and exponent bits of the divisor are ignored since they do not influence whether the divisor is an integer power of two. Turning now to FIG. 11B, details of another embodiment of detection unit 182 are shown. In this embodiment, however, the internal format of the divisor's significand is assumed to be normalized with an implicit one before the most significant bit. Once again, in some embodiments the sign bit and exponent bits of the divisor may be ignored since they do not influence whether the divisor is an integer power of two.

Note, in one embodiment, detection unit 182 may further comprise logic configured to negate the exponent of divisors that are integer powers of two to generate the exact reciprocal. The exact reciprocal for a divide-by-two operation will have a significand in form of "1.0000". Since the exponents may be biased, however, generating the exact reciprocal may involve more complex logic than mere inverters. For example, an adder may be used in some embodiments of detection unit 182. Once the exponent has been negated, the exact reciprocal may be conveyed to multiplexers 176 or 178 for input to multiplier core 112. The exponent arithmetic may be timed to occur during the initial approximation lookup phase from ROM 174. Once the reciprocal has been calculated, the reciprocal and the dividend are multiplied using the LASTMUL operation. The results are then rounded using the BACKMUL operation (see below). This configuration of multiplier 50 may advantageously reduce the latency of divide-by-two operations while still ensuring proper rounding.

Detection unit 182 may also be configured to detect zeros. This may be accomplished in a manner similar to that illustrated in FIGS. 11A–B. In some embodiments, however, the exponent bits and possibly the sign bit may also be examined (e.g., by using NOR gates as illustrated). In still another embodiment, detector unit 182 and or multiplier control unit 110 may receive classification bits (generated by convert and classify unit 336) for each divisor. One of these classification bits may be configured to indicate whether the corresponding operand is a zero. Since in such an embodiment the classification has already been performed, detection unit 182 and multiplier control unit 110 may be configured to simply examine the corresponding classification bits in lieu of examining every bit in the significand.

Once a zero divisor is detected, detection unit 182 may signal multiplier control unit 110 accordingly. In one embodiment, multiplier 50 may be configured to perform a LASTMUL and a BACKMUL operation for zero dividend operations. This may advantageously simplify the state machine within multiplier control unit 110. In another embodiment, either multiplier core 113, multiplier control unit 110, or detection unit 182 may be configured to hardwire the result to zero and route it the output of multiplier 10 in a single multiplier cycle.

Figure 12A:
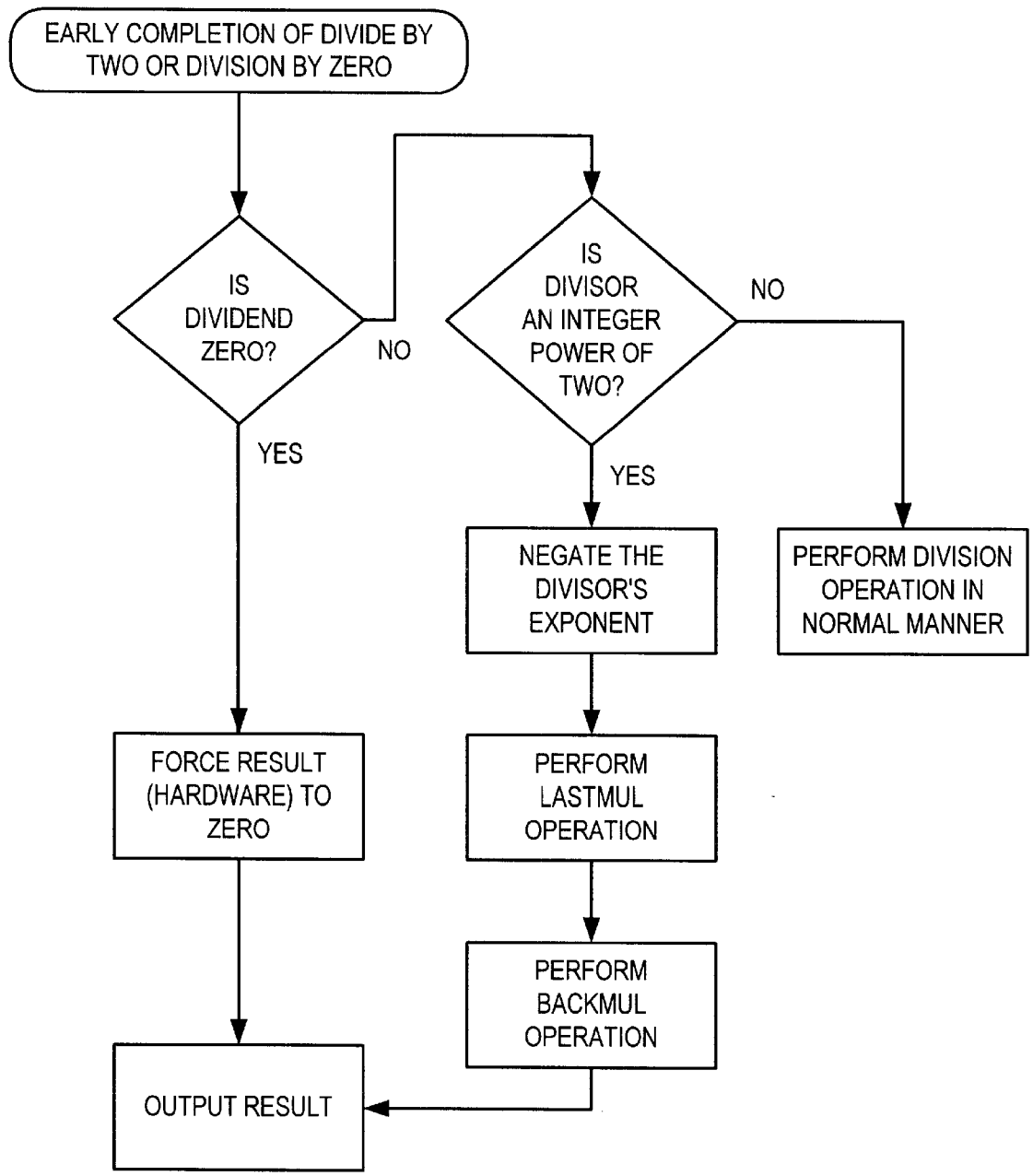
FIGS. 12A–B are flow charts illustrating different embodiments of a method for rapidly executing divide-by-two and zero dividend operations.
Figure 12B:
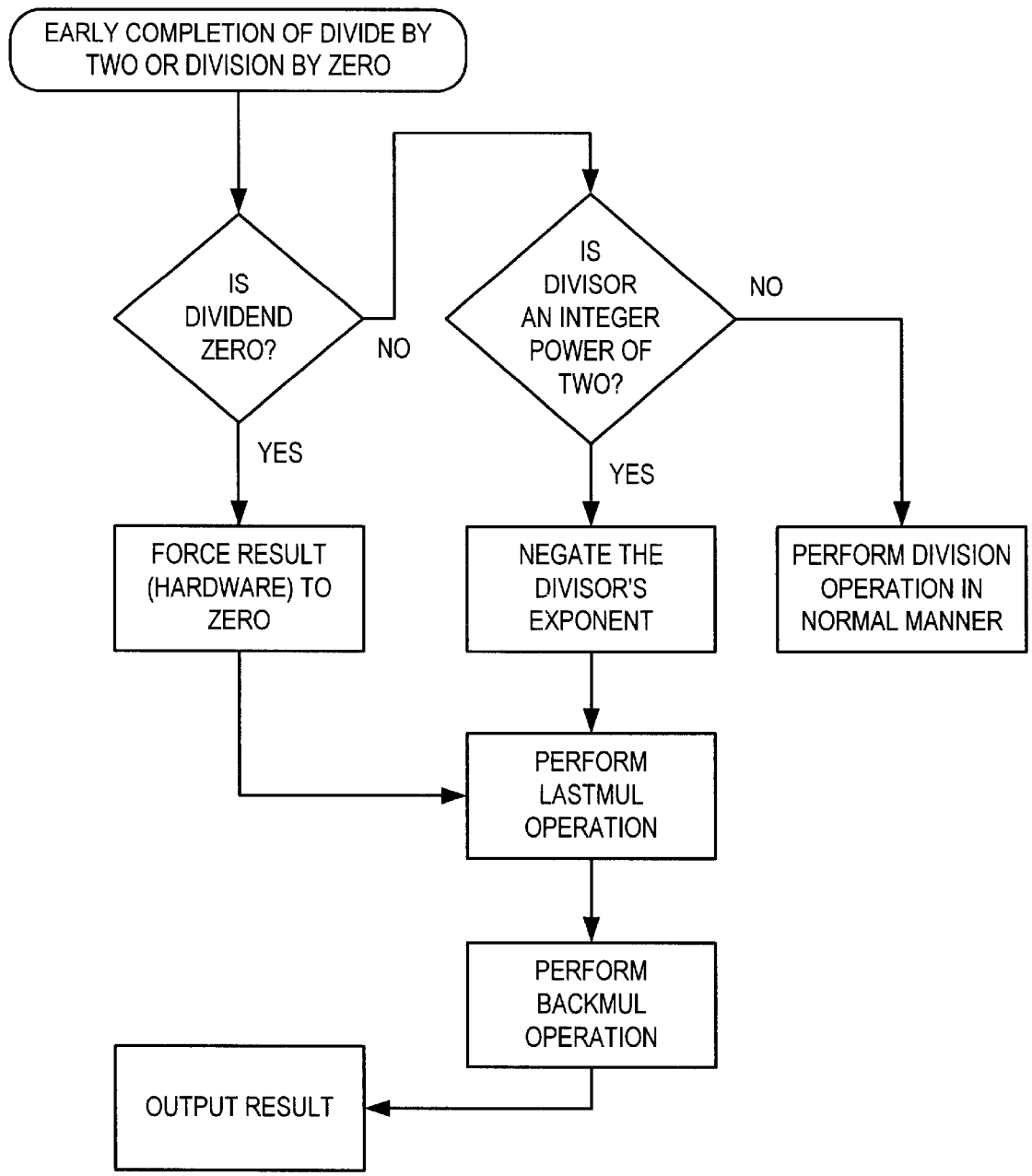

Turning now to FIG. 12, a flowchart representing one embodiment of a multiplier configured to perform early completion of divide-by-two and zero dividend operations is shown.

Iterative Calculation Opcodes

As previously noted, calculations such as division and square root are performed using iterative operations (see e.g., FIG. 6). In some embodiments, each iteration may correspond to a particular opcode issued to multiplier core 112 by scheduler 314 or by multiplier control unit 110. One possible set of opcodes are described below:

Itermul

For example, the first three iterations of a division instruction (e.g., iterations 90, 92, and 94 in FIG. 6) may be invoked by repeatedly issuing an ITERMUL opcode. ITERMUL is a multiplication operation that forces the multiplier core 112 to use round-to-nearest rounding. In one embodiment, this opcode assumes that each of the input operands is 76 bits wide, and generates a 152-bit intermediate result that is rounded to 76 bits.

Lastmul

Similarly, LASTMUL is a multiplication operation that corresponds to the next-to-last iteration in a division operation (e.g., iteration 96 in FIG. 6). LASTMUL also forces multiplier core 112 to use round-to-nearest rounding. It performs the rounding to a precision that is one bit wider than the target precision specified by the original division instruction (i.e., one bit wider than normal to accommodate uncorrected rounding errors that may accumulate throughout multiple iterations). For example, if a 24-bit significand is the desired output, ITERMUL may generate a 25-bit result (i.e., rounded to the 25th bit). This yields a maximum error that is no greater than ±½ of the least significant bit, i.e., the 24th bit, (effectively keeping one guard bit—the 25th bit). The 25th bit is used to help choose the 24th bit during rounding. Just prior to the rounding of this operation, the double-width product Q' is accurate to at least $-2^{-(pc+2)} < Q - Q' < 2^{-(pc+2)}$, where Q is the infinitely precise quotient, and "pc" is the target precision in bits, where 1 ulp, for such a pc bit number is $2^{-(pc-1)}$.

In one embodiment, exact rounding may be implemented by generating results that have an error no worse than ±0.5 ulp, or (2-pc). In another embodiment, the rounding algorithm utilized by multiplier 50 may rely upon the results being computed to an accuracy of at least one additional bit. Since the final quotient result may be in the range of (0.5,2), one bit of normalization may occur, thereby requiring yet another bit of accuracy. For square root operations, just prior to the rounding of this operation, the double-width product S' is accurate to at least $-2^{-(pc+1)} < S - S' < 2^{-(pc+1)}$, where S is the infinitely precise square root, and pc is the target precision in bits. Since the square root result is in the range [1,2), it has a looser constraint on the accuracy of the input to this operation.

After rounding and normalizing to pc +1 bits through the LASTMUL op, the resulting value R" satisfies $-2^{-pc} < R - R" < 2^{-pc}$, where R is either the infinitely precise quotient or square root as appropriate. Thus, the value can have an error of (−0.5,+0.5) ulp with respect to the final pc bit number.

Backmul

BACKMUL is a multiplication operation opcode that operates on the two source operands, and it also accepts a third operand. In one embodiment, BACKMUL adds the 152-bit intermediate product of the two sources in carry-save form to an inverted version of the third operand, with the low-order bits filled with ones. These three values are then input into rounding carry-save adders (with the unused LSB carry bit set to one), thus realizing the function of bxq+TwosComp(a). This implements the negative version of the back multiply and subtraction operation to form the remainder. In other words, bxq−a is implemented instead of the desired a−bxq.

The sign of this remainder is thus the negative of the true remainder sign. This operation returns two bits of status: whether the sign of the remainder is negative, taken from a high order bit of the result, and whether the remainder is exactly zero, using fast sticky-bit logic. Since q may be rounded to any of four precisions, the high order bit is chosen high enough to allow it to suffice for all of the precision.

Figure 13:
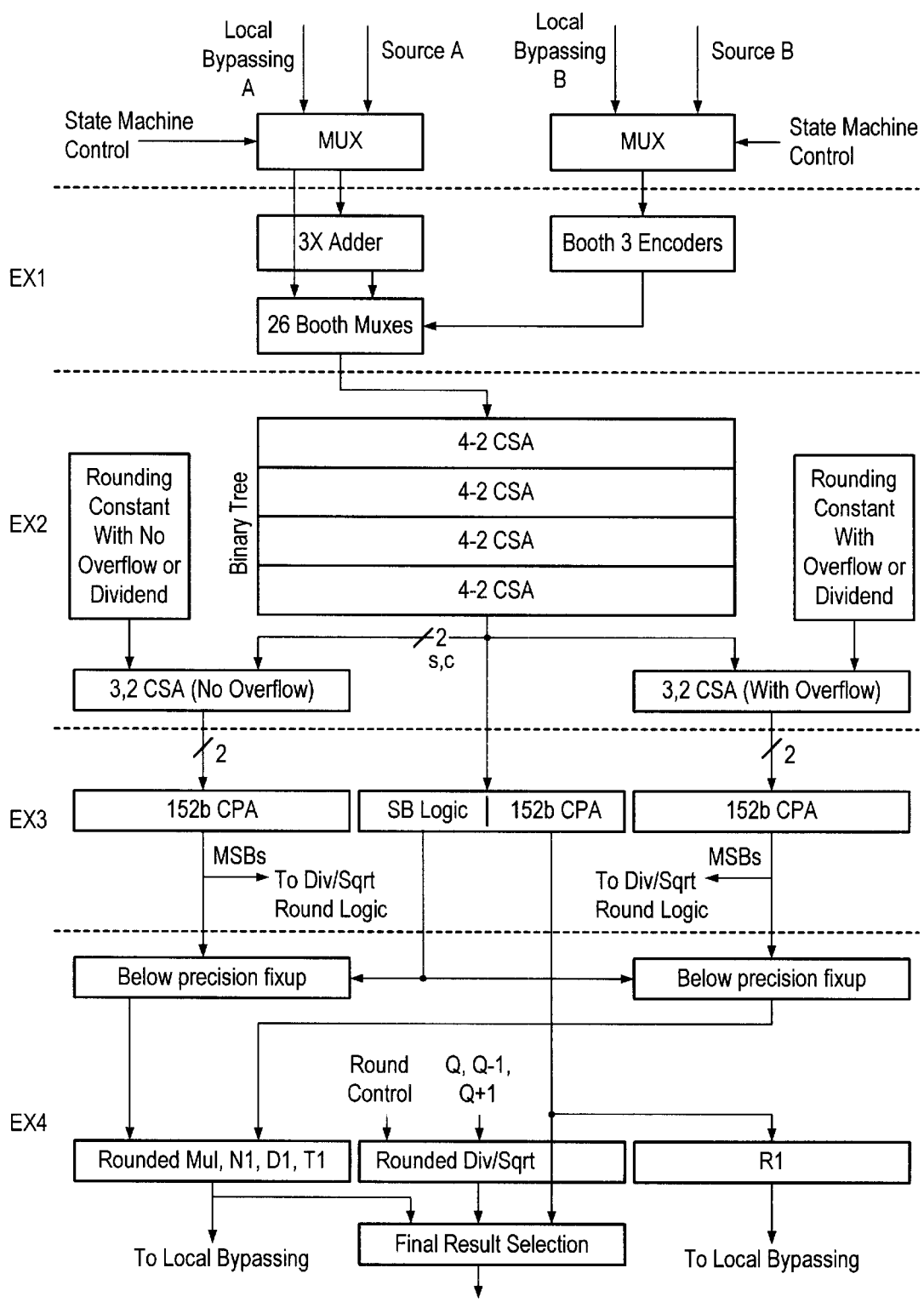
FIG. 13 is a diagram illustrating another embodiment of the multiplier from FIG. 3.

Turning now to FIG. 13, one embodiment of multiplier core 112 configured to execute ITERMUL, LASTMUL, and BACKMUL is shown. Advantageously, by executing these opcodes, the 3,2 carry-save adders in pipeline stage EX2 that are normally configured to perform rounding may be "overloaded" to perform the addition described above in calculating bxq+TwosComp(a). This may advantageously reduce the amount of hardware needed to implement rounding.

Additional information regarding these and other potential opcodes for use with multiplier 50 and FPU 36 are discussed in the Appendix entitled "Floating Point Division and Square Root Algorithms and Implementation in the AMD K7™ Microprocessor," by Stuart Oberman, of U.S. patent application Ser. No. 60/098,613, filed on Aug. 31, 1998; this Appendix is hereby incorporated by reference in its entirety as though filly and completely set forth herein.

Note, the opcodes presented herein and in the Appendix are for exemplary purposes only and other opeodes may be implemented in addition to, or in place of, these opcodes.

Exemplary Computer System Using Multiplier

Figure 14:
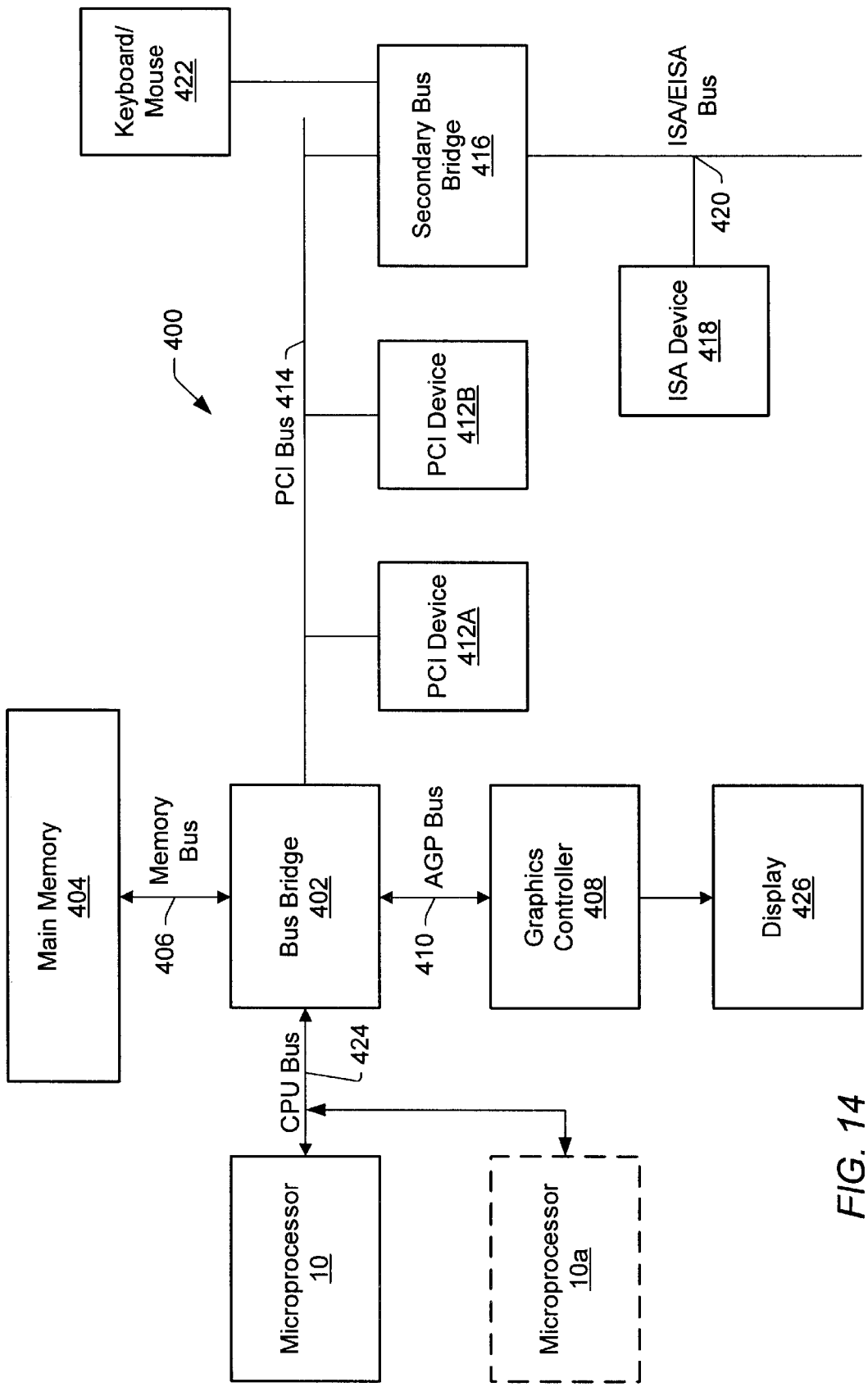
FIG. 14 is a block diagram of one embodiment of a computer system configured to utilize the microprocessor of FIG. 3.

Turning now to FIG. 14, a block diagram of one embodiment of a computer system 400 configured to utilize microprocessor 10 is shown. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A floating point unit configured to divide a dividend by a divisor using iterative multiplication operations, said floating point unit comprising:
a divide-by-two detection unit configured to detect when said divisor is an integer power of two,
a reciprocal calculation unit coupled to said divide-by-two detection unit, wherein said reciprocal calculation unit is configured to calculate an exact reciprocal of said divisor in response to said divisor being an integer power of two, and
a multiplier coupled to said divide-by-two detection unit and said reciprocal calculation unit, wherein said multiplier is configured to perform a first multiplication operation by multiplying said exact reciprocal and said dividend to form a first product.

2. The floating point unit as recited in claim 1, wherein said multiplier is further configured to perform a second multiplication operation by multiplying said first product with said divisor to form a second product.

3. The floating point unit as recited in claim 2, wherein said multiplier is further configured to determine whether said dividend minus said second product will be positive, negative, or zero.

4. The floating point unit as recited in claim 1, wherein said divide-by-two detection unit is further configured to detect dividend operands that have a value of zero.

5. The floating point unit as recited in claim 1, wherein said floating point unit is configured to execute divide-by-two operations using fewer multiplication operations than used for normal operations, wherein normal operations are divide operations that are not divide-by-two operations and are not zero dividend operations.

6. The floating point unit as recited in claim 1, wherein said floating point unit is configured to execute zero-dividend divide operations using fewer multiplication operations than normal operations, wherein normal operations are divide operations that are not divide-by-two operations and are not zero dividend operations.

7. The floating point unit as recited in claim 1, wherein said floating point unit further comprises a scheduler configured to schedule floating point instructions for execution, wherein the multiplier is configured to assert a signal to the scheduler at least N clock cycles before the multiplier is ready to accept a new instruction, wherein N is a number at least as large as the number of clock cycles the scheduler requires to schedule a next instruction.

8. The floating point unit as recited in claim 1, wherein said floating point unit is configured to complete instructions having one or more operands equal to zero in fewer clock cycles than instructions having no operands that are equal to zero.

9. A method for executing floating point division instructions in a floating point unit, said method comprising:
generating a reciprocal of a divisor using iterative multiplication operations;
detecting divide instructions that specify a divisor that is an integer power of two;
calculating an exact reciprocal of the divisor in response to said divisor being an integer power of two; and
multiplying the exact reciprocal and a dividend of the divide instruction to form a first product.

10. The method as recited in claim 9, wherein the exact reciprocal is calculated by negating the exponent of the divisor.

11. The method as recited in claim 9, further comprising performing a second multiplication operation by multiplying said first product with said divisor to form a second product.

12. The method as recited in claim 9, further comprising asserting a signal at least N clock cycles before the floating point is ready to accept a new instruction, wherein N is a number at least as large as the number of clock cycles needed to schedule a next instruction.

13. The method as recited in claim 9, further comprising detecting dividend operands that have a value of zero, and forcing a result of zero for detected dividend operands that have a value of zero.

14. The method as recited in claim 9, further comprising:
detecting division instructions having a divisor that is an integer power of two,
negating the divisor's exponent, and
multiplying the divisor with the dividend.

15. The method as recited in claim 14, further comprising maintaining state information to allow the multiplier to schedule variable latency instructions, and using the state information to schedule instructions following a divide-by-two or zero dividend instruction for execution.

16. The method as recited in claim 9, further comprising:

performing division operations by calculating the reciprocal of the divisor; and multiplying the dividend with the reciprocal, wherein the reciprocal is calculated using a Newton-Raphson iteration.

17. The method as recited in claim 16, further comprising detecting and executing instructions having zero divisors in a single iteration.

18. A computer system comprising:

a main memory;

a communications device;

a system bus; and a microprocessor, wherein said microprocessor, said main memory, and said communications device are coupled via the system bus, and wherein the microprocessor comprises a floating point unit, wherein the floating point unit comprises:

a divide-by-two detection unit configured to detect when said divisor is an integer power of two, a reciprocal calculation unit coupled to said divide-by-two detection unit, wherein said reciprocal calculation unit is configured to calculate an exact reciprocal of said divisor in response to said divisor being an integer power of two, and a multiplier coupled to said divide-by-two detection unit and said reciprocal calculation unit, wherein said multiplier is configured to perform a first multiplication operation by multiplying said exact reciprocal and said dividend to form a first product.

19. The computer system as recited in claim 17, further comprising a second microprocessor coupled to said first microprocessor via a CPU bus, wherein said second microprocessor is configured similarly to said first microprocessor.

* * * * *